Figure 1:
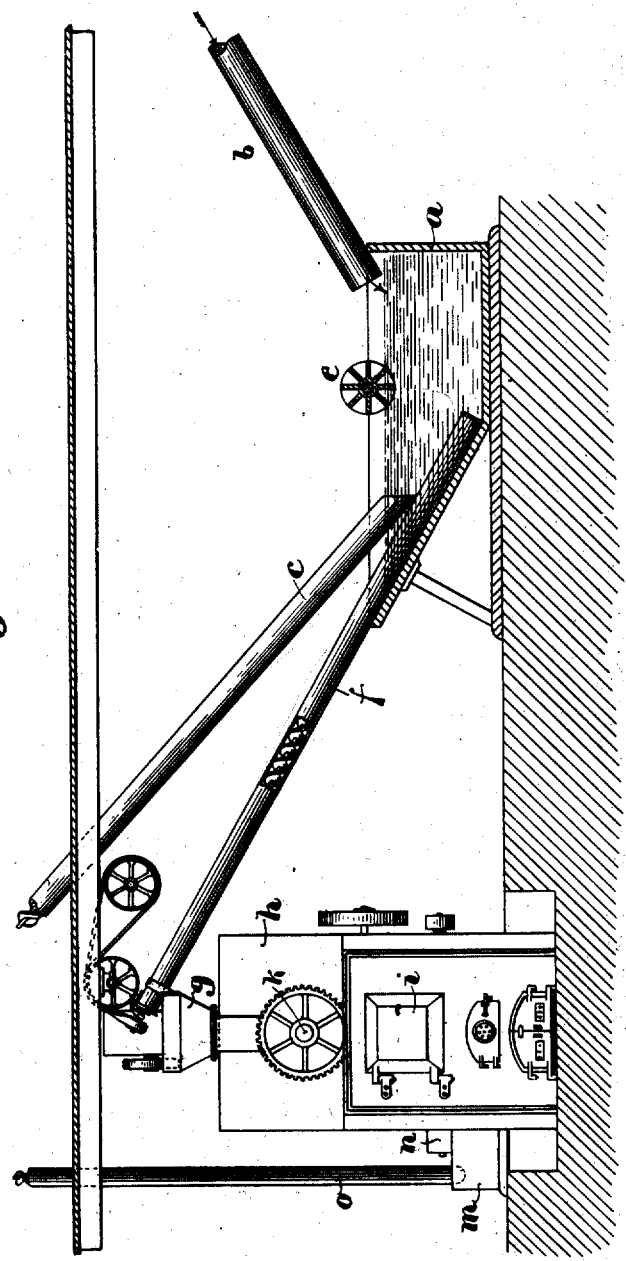

No. 689,193. Patented Dec. 17, 1901.
N. M. JONES.
PROCESS OF SEPARATING CHIPS FROM KNOTS, &c.
(Application filed Feb. 5, 1901.)
(No Model.) 4 Sheets—Sheet 1.

Witnesses:
Walter E. Lombard
A. S. Herrion

Inventor:
N. M. Jones
by Wright Brown Quimby
Attys.

No. 689,193. Patented Dec. 17, 1901.
N. M. JONES.
PROCESS OF SEPARATING CHIPS FROM KNOTS, &c.
(Application filed Feb. 5, 1901.)
(No Model.) 4 Sheets—Sheet 2.

Witnesses:
Walter E. Lombard
A. S. Harrison

Inventor:
N. M. Jones
by Wright Brown & Quinby
Attys.

No. 689,193. Patented Dec. 17, 1901.
N. M. JONES.
PROCESS OF SEPARATING CHIPS FROM KNOTS, &c.
(Application filed Feb. 5, 1901.)
(No Model.) 4 Sheets—Sheet 3.

Witnesses:
Walter E. Lombard
A. D. Harrison

Inventor:
N. M. Jones
by Wright Brown & Quinby
Attys.

No. 689,193. Patented Dec. 17, 1901.
N. M. JONES.
PROCESS OF SEPARATING CHIPS FROM KNOTS, &c.
(Application filed Feb. 5, 1901.)

(No Model.) 4 Sheets—Sheet 4.

Witnesses:
Walter E. Lombard.
A. S. Harrison

Inventor:
N. M. Jones
by Wright Brown Quimby
Attys.

UNITED STATES PATENT OFFICE.

NATHANIEL M. JONES, OF LINCOLN, MAINE.

PROCESS OF SEPARATING CHIPS FROM KNOTS, &c.

SPECIFICATION forming part of Letters Patent No. 689,193, dated December 17, 1901.

Application filed February 5, 1901. Serial No. 46,105. (No specimens.)

*To all whom it may concern:*

Be it known that I, NATHANIEL M. JONES, of Lincoln, in the county of Penobscot and State of Maine, have invented certain new and useful Improvements in Processes of Separating Chips from Knots, &c., of which the following is a specification.

This invention relates to the preparation of wood-chips for the process of cooking in a pulp-digester; and it involves the hereinafter-described improved method of effecting a thorough separation of the clear-wood chips, which are suitable for the manufacture of pulp, from the resinous-knot-wood chips and fragments and from dirt and other foreign matter, all of which are objectionable in wood-pulp.

In accordance with my invention I first submerge the wood-chips as they come from the chipping or cutting machine, mixed with fragments of resinous knot-wood, bark, and other foreign matter of greater specific gravity than the clear-wood chips, in a tank containing any suitable liquid, such as water. In the tank the particles and fragments whose specific gravity exceeds that of water sink to the bottom, while the lighter chips and particles rise to the surface. The particles and fragments that sink include all the resinous knot-wood, bark, and other foreign matter, while the fragments and particles that float are composed wholly of clear wood. It often happens, however, that there is a considerable percentage of clear - wood chips which are originally of such specific gravity that they sink with the resinous-knot-wood fragments, owing to the fact that they are made from green wood saturated with sap or from wood that has been water-soaked. I therefore provide a drying apparatus and means for transferring to the same the entire mass of matter which settles to the bottom of the receiving-tank. In this drier the water-soaked clear-wood chips are dried and thus prepared for separation from the resinous chips and foreign matter by immersion in a second separating-tank, into which they pass from the drier, the resinous knot-wood and foreign matter being practically unaffected by the drying operation, so that they sink, as before. The chips that originally rise in the first separating-tank are conveyed from the latter to a bin or hopper, from which they are fed to the digesters.

The new feature of my present invention is the drying of the mass of chips that settle to the bottom of the first separating-tank and the subsequent separation of the dried clear-wood chips from the resinous chips.

Figure 2:
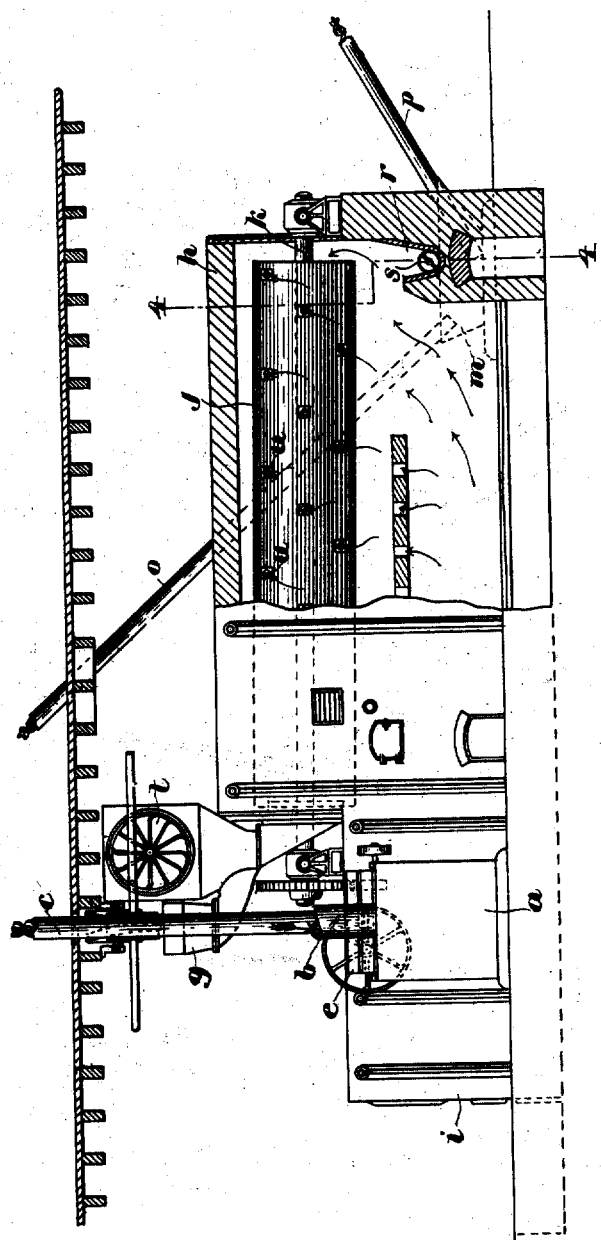
Figure 3:
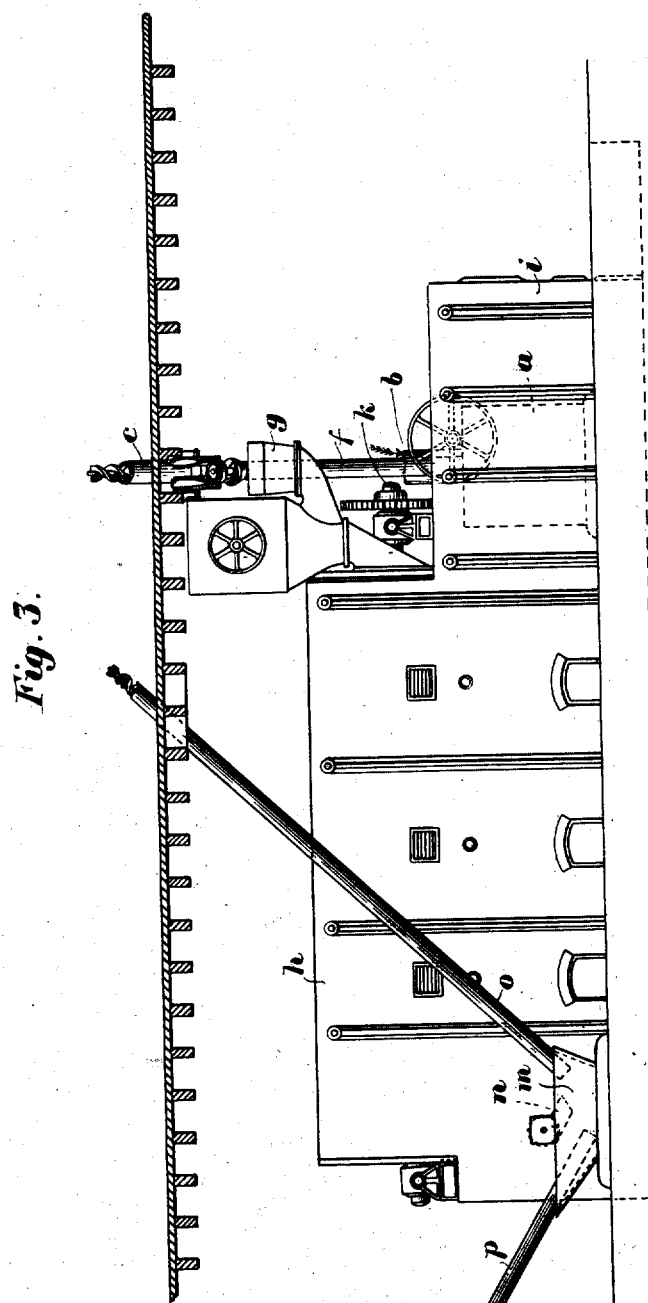
Figure 4:
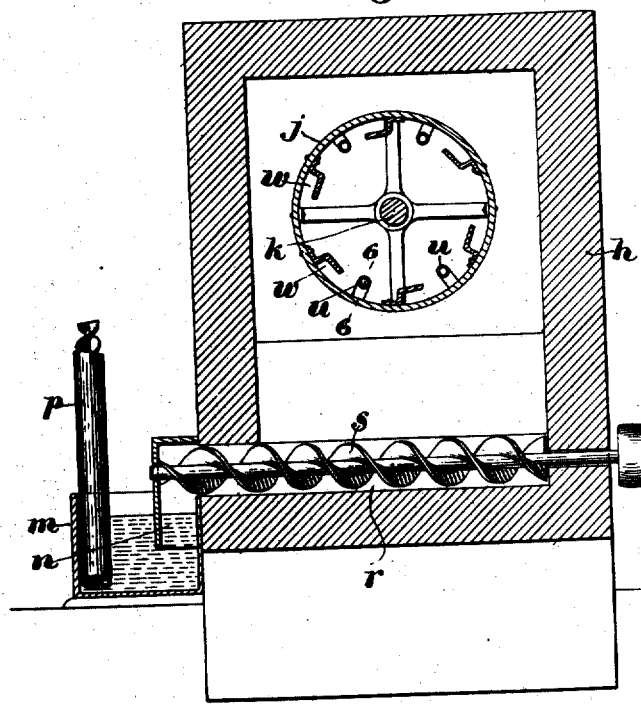
Figure 5:
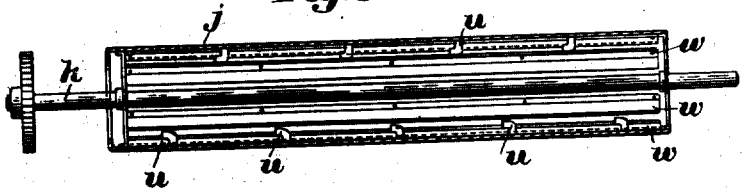
Figure 6:

Of the accompanying drawings, forming a part of this specification, Figure 1 represents a partial sectional view and partial elevation of an apparatus by which my invention may be practiced, the drying apparatus being shown in end elevation. Fig. 2 represents a view of the same parts, showing the drying apparatus in side elevation and partly in section. Fig. 3 represents an elevation from the side opposite that shown in Fig. 2. Fig. 4 represents a section on line 4 4 of Fig. 2. Fig. 5 represents a longitudinal section of the drier-cylinder. Fig. 6 represents a section on line 6 6 of Fig. 4.

The same reference characters indicate the same parts in all the figures.

In the drawings, $a$ represents the primary separating-tank, which contains a suitable liquid, such as water, and receives the entire mass of chips from the chipping or cutting machine through a spout or conductor $b$. The chips and fragments having a specific gravity greater than that of water settle to the bottom of the tank, these including the resinous knot-wood chips and particles of bark, dirt, and foreign matter, and usually a quantity of green or water-soaked clear-wood chips. The relatively dry clear-wood chips float in the liquid in the primary tank $a$ and are elevated from the latter through a suitable conveyer $c$ to a chip bin or receiver, (not shown,) from whence they are fed to the pulp-digesters. The carrier $c$, as here shown, comprises a screw conveyer and a suitable casing in which the conveyer rotates, the lower end of the casing and screw being submerged in the upper portion of the water in the tank $a$.

$e$ represents a rotary beater which is arranged to act upon the chips floating upon the surface of the liquid in the tank $a$ and force them down into the liquid, the beater scattering the chips and preventing them from accumulating in masses which would cause the heavier knot-wood chips to be supported by a raft of clear-wood chips.

$f$ represents a conveyer which extends from the bottom of the tank $a$ upwardly to a spout or hopper $g$. The conveyer $f$ may be of the same construction as the conveyer $c$ and is adapted to raise from the bottom of the tank the entire mass of sunken chips, knots, and other matter that have settled therein and deposit said chips in the spout $g$. Said spout communicates with a drying apparatus which includes a casing $h$, having a heater or furnace $i$ and a rotary cylinder $j$ affixed to an inclined shaft $k$ and located in the upper part of the casing $h$, the arrangement being such that the heat from the furnace $i$ circulates through and around the cylinder $j$. The higher end of the cylinder $j$ communicates with the spout $g$, so that the chips delivered to said spout enter the higher end of said cylinder and are caused by the inclination and the rotary movement of the cylinder to move slowly toward the lower end of the latter, the cylinder being rotated by power applied in any suitable way to the shaft $k$. The drying action to which the chips are subjected is such that any clear-wood chips that may have sunk to the bottom of the primary tank will have their specific gravity so decreased that when they are immersed in a body of water in a secondary tank $m$, into which they pass through a spout $n$ from the lower end of the cylinder $j$, they will float upon the surface of the liquid in said tank, the specific gravity of the resinous knot-wood chips, bark, and dirt being unaffected by the drying operation, so that they fall to the bottom of the tank, the result being a complete separation of all the clear-wood chips from the resinous chips.

$o$ represents a conveyer which may be similar to the conveyers $c$ and $f$ and extends from the upper part of the secondary tank $m$ to the clear-wood-chip receptacle. (Not shown.)

$p$ represents a conveyer which extends from the bottom of the secondary tank $m$ and removes from the latter the resinous chips and other matter which accumulate at the bottom of the tank $m$.

It will be seen that by the above-described process I effect a complete separation of the clear-wood chips from the resinous chips and foreign matter, thus preventing the entrance into the pulp-digesters of fragments of knot-wood, bark, &c., and avoiding any waste of clear-wood chips suitable for pulp.

I do not limit myself to the use of the secondary tank as the means for separating the dried clear-wood chips from the heavier chips and fragments, as this separation may be effected by an air-blast or by any other suitable means. The chips may fall from the lower end of the cylinder $j$ into a trough $r$, which communicates with the spout $n$ and contains a screw $s$, which conveys the chips to the spout.

$t$ represents an exhaust-fan, which draws the heated air and products of combustion from the furnace $i$ through the cylinder $j$, the latter being provided with bent tubes $u$, Figs. 4, 5, and 6, through which the hot air enters the cylinder. The tubes may be provided with screws $v$ at their inner ends to prevent the chips from escaping through the tubes. The cylinder is provided internally with brackets $w$, which as the cylinder rotates raise and discharge the chips, keeping them in active circulation.

The apparatus above described is claimed by me in another application for Letters Patent of the United States. Any other suitable apparatus or means may be employed in practicing the process herein described and claimed.

I claim—

1. The improved method of assorting wood-chips, the same consisting in first separating the chips into two grades in accordance with their specific gravity, then drying the chips of the heavier grade to reduce the specific gravity of any clear-wood chips therein, and then separating the dried clear-wood chips from the heavier knot-wood chips.

2. The improved method of assorting wood-chips, the same consisting in immersing the chips in a body of liquid, and thereby causing their separation into two grades, separately removing the lighter and the heavier chips, drying the heavier chips, and again immersing the dried chips in a body of liquid.

3. The improved method of assorting wood-chips, the same consisting in putting the chips in a body of liquid, and thereby causing their separation into two grades, separately removing the lighter and the heavier chips, drying the heavier chips, and again putting the dried chips in a body of liquid.

4. The process of separating wood-chips, consisting in, first, putting a mass of wood-chips containing clear-wood chips and knotty wood into or upon a body of liquid to cause the floatable clear-wood chips to float upon the surface while the knotty wood and water-logged clear-wood chips sink in the liquid; second, removing the knotty wood and water-logged clear-wood chips, and drying the same; and third, putting the dried wood into or upon a body of liquid to cause the dried clear-wood chips and knotty wood to separate according to their respective specific gravities, substantially as and for the purpose described.

5. The process of separating wood-chips which consists in drying a mass of chips composed of clear-wood chips and chips containing knots, resinous matter, &c., to free the clear-wood chips from moisture so that they will float and then putting the dried chips into a body of liquid to cause the clear-wood chips and those containing knots, resinous matter, &c., to be separated.

6. The process of separating wood-chips, consisting in, first, drying a mass of clear-wood chips and knotty wood, and then putting the dried wood into a body of liquid to cause the dried clear-wood chips and the knotty wood to separate according to their respective specific gravities, substantially as and for the purpose described.

In testimony whereof I have affixed my signature in presence of two witnesses.

NATHANIEL M. JONES.

Witnesses:
C. F. BROWN,
A. D. HARRISON.